Patented Mar. 17, 1925.

1,530,392

UNITED STATES PATENT OFFICE.

JACQUE C. MORRELL, OF CHICAGO, ILLINOIS.

PROCESS OF MAKING COMPOUND ADSORBENT CATALYSTS.

No Drawing.    Application filed March 31, 1922. Serial No. 548,476.

*To all whom it may concern:*

Be it known that I, JACQUE C. MORRELL, a citizen of the United States, residing at Chicago, in the county of Cook and State of Illinois, have invented certain new and useful Improvements in Processes of Making Compound Adsorbent Catalysts, of which the following is a specification.

This invention relates to compound adsorbent catalysts, and among the objects of this invention is the production of various charcoal catalysts adapted to a great variety of uses in catalytic reactions.

In preparing these catalysts, the various active catalytic components, as the various substances, elements or compounds will be referred to herein, are introduced into a charcoal body which in general serves as a carrier but owing to its high activity is itself sometimes capable of functioning as a catalyst as well as a carrier or adsorbing agent. The primary function of the charcoal is, in general, to bring the reacting substances by adsorption into the sphere of the active catalytic component and thereby assist the latter in facilitating the reaction. My process of introducing the active catalytic component, as well as the mode of producing the charcoal, insures the greatest area of active surface which is of vital importance in catalytic reactions.

In preparing the compound adsorbent catalysts, I make use of the processes disclosed in my U. S. Patents Nos. 1,478,985, 1,478,986 and 1,478,987, for the preparation of the built-up structural adsorbent charcoal, making such modifications as are necessary or convenient for the purposes of the present process. I prefer to employ the process disclosed in my Patent No. 1,478,985, wherein some form of carbon or charcoal is added to an emulsion of a binder which chars on heating and after filtering the mixture, drying and molding the residue, the molded material is comminuted and activated by heating and, if desired, treated with steam or other mild oxidizing agent.

In the process constituting the present invention the active catalytic component is added to the adsorbent charcoal as it is produced by the processes disclosed in my co-pending applications, and I will now describe the method for the proper incorporation and distribution of the active catalytic component in the built-up structural adsorbent charcoal.

When the character is prepared according to the process disclosed in my Patent No. 1,478,985, the incorporation of the active catalytic component is made, preferably, at the stage of the process where the carbon is added to the emulsified binder. Some of the methods of accomplishing this are as follows:

(*a*) The active catalytic component is intimately mixed with the carbon and this mixture added to the emulsified binder.

(*b*) The carbon in aqueous suspension is added to an aqueous suspension of the active catalytic component or vice-versa and the mixed suspension in turn, added to the emulsified binder.

(*c*) The suspensions of carbon and active catalytic component may be added separately to the emulsified binder in any order, but preferably the suspension of active catalytic component is added first.

The mixture prepared by either of these methods is then filtered and the residue subjected to drying, molding, comminuting and activation. The quantity of carbon may vary from 1 to 4 times the total actual binding material.

Other methods of accomplishing this purpose, as set forth in my co-pending applications are as follows:

(*a*) Introducing a mixture of the carbon and active catalytic component into a solution of a binding material which chars on heating, separating the solvent by distillation and then molding the residue, comminuting the molded material, charring the binding material therein and activating.

(*b*) Mixing carbon and the active catalytic component with hard pitch or other non-fluid binder which chars on heating, moistening the latter with oil, tar or other organic liquid which will dissolve, disperse or flux with the binder, molding the mixture and then comminuting the molded material, charring the binding material therein and activating. In this process the excess liquid should be removed by gently heating either before or after molding.

(*c*) Mixing carbon and the active catalytic component with a non-fluid, water-soluble binding material which chars on heating, moistening with water, molding and then comminuting the molded material, charring the binding material therein and activating. The excess water is removed by evaporation directly before or after molding. Under certain circumstances a concentrated solution of a solid water-soluble binder may be used instead of a non-fluid, water-soluble binder.

(d) Mixing carbon with a non-fluid binding material which chars on heating, heating the mixture to such a temperature as will cause the binder to melt or soften and molding the mixture or else heating during the molding step, and then comminuting the molded material, charring the binding material therein and activating.

(e) Mixing carbon and the active component with a liquid binder, or a solution of a binder which chars on heating and then separating the solvent by distillation, molding the residue, comminuting the molded material, charring the binding material therein and then activating.

By the term "carbon" is meant pure carbon or a mixture of natural or artificial origin which contains a high percentage of carbon. This includes the various charcoals and carbons of animal, vegetable or mineral origin.

Examples of active catalytic components are as follows:

(a) Metallic and other elementary substances which exhibit catalytic properties under practically all circumstances. Typical examples of these are aluminum, zinc, cobalt, copper, iron, manganese, molybdenum, nickel, titanium, tungsten, uranium, vanadium, gold, silver, tellurium, selenium, boron, silicon and the rarer heavy metals such as platinum, palladium, rhodium, irridium, osmium, and others, as well as alloys of any two or more of the above named substances. In fact, I may resort to the whole list of chemical elements which occur in the solid state and are practically non-volatile at slightly elevated temperatures.

(b) Oxides and other compounds of the above which are insoluble in water, including also the oxides of some of the rarer elements, such as cerium, praseodymium, radium, lanthanum, rubidium, thorium and others as well as lithium, barium and others.

(c) Minerals including ores, silicates and other rocks and natural radio-active substances.

In general, metals, alloys, inorganic compounds and elementary substances of natural or artificial origin, singly or mixed, which under any circumstances show catalytic properties. These substances in all cases are solids. In some cases desirable substances of a totally different nature than those introduced are formed by a chemical action such as the reduction of oxides by the charcoal in heating (copper oxide reduced to copper). The formation of chlorides such as aluminum chloride by treating charcoal containing aluminum or aluminum compounds with chlorine, are changes occurring when charcoal carrying the catalyst is treated with steam or other vapors or gases. The amount of the active catalytic component introduced into the charcoal varies according to the purpose for which the catalyst is intended and also with the nature of the active component. This variation is from a mere trace to a volume equal to that of the charcoal. Preferably, the active catalytic component should be in a finely divided condition.

The product prepared according to this invention has the reacting substances properly distributed so as to utilize the catalytic properties thereof to the greatest possible extent. The reacting substances are adsorbed on the surface of the highly active charcoal or carbon, which may itself function as a catalyst in some cases, but which in most cases serves as a carrier or adsorbent. In my product the active catalytic component serving as a catalyst, is in substantially uniform distribution throughout the charcoal.

Among the variety of uses of my compound charcoal catalysts may be mentioned the following:

(1) Hydrogenation of unsaturated organic compounds such as oils. For this purpose the compound catalysts may have associated with the charcoal the metals nickel, palladium, copper or iron or compounds of nickel such as the oxide or silicate. Various oxides may also be employed with cobalt, nickel, cerium or copper compounded with charcoal. These compound charcoal catalysts have been found highly active in hydrogenating fish oils for soap making, yielding a practically odorless soap and also in hydrogenating cotton seed oils to make lard substitutes. For example, 92% cotton seed oil or other vegetable oil and 8% cocoanut oil when treated with hydrogen at 150–160° C. in the presence of my compound charcoal-nickel catalyst will yield, after removal of the catalyst, a fine flavored edible product. I have found the action to be much quicker than when nickel alone is used and the flavor of the product highly improved.

(2) Hydrocarbon oils may be decolorized and deodorized by treatment with a small amount of a compound charcoal catalyst having associated therewith nickel, iron, cobalt, copper, or a mixture of two or more of these while passing therethrough a slow stream of hydrogen at about 175° C.

(3) Compound charcoal catalysts with nickel or copper or both may be used in the presence of hydrogen to reduce nitrobenzene to aniline. When nickel is used as the component of my compound catalyst, a yield of 70-90% is obtained but too great reduction should be avoided. Copper-charcoal catalysts act more uniformly, yielding about 90% of aniline, but care should be taken not to heat above 500° C. The best results are obtained when a temperature of around 275° C. is employed. Charcoal-iron catalysts also give good results in the production of aniline from nitrobenzene.

(4) Ammonia may be synthesized from its elements by using a catalyst of charcoal-iron or charcoal-osmium. One volume of nitrogen is used to three volumes of hydrogen, the reaction being conducted under high pressure and at 500–700° C.

(5) Ethylene and other unsaturated hydrocarbons in the presence of charcoal-copper or charcoal-iron catalysts are converted by hydrogen at comparatively low temperatures into saturated compounds such as ethane, etc. If cobalt or nickel is employed as the component of the compound catalyst, these reactions also take place, but not so advantageously.

(6) In the presence of charcoal-copper catalyst, alcohol is resolved into aldehyde and hydrogen. In the presence of charcoal-alumina catalyst or charcoal-thoria catalyst, the vapor of ethyl alcohol is almost entirely converted into ethylene at 340–350° C. Other primary alcohols act similarly in the presence of the charcoal-alumina catalyst. At lower temperatures, for example 240–260° C., the charcoal-alumina catalyst separates ethyl alcohol into ether and water.

(7) Various metal charcoal catalysts and oxide charcoal catalysts will catalyze the dehydrogenation of primary and secondary alcohols into aldehydes and ketones. The copper-charcoal catalyst is very active in this respect at 200–300° C. Cyclic alcohols react in the same way; for example, borneol is transformed into camphor at 150° C. by the charcoal-copper catalyst.

(8) These compound charcoal catalysts have been found suitable in those reactions where promotor catalysts are used. The promotor catalysts are usually made up of a plurality of substances, usually metals which are more active when used in combination than singly. For example, a mixture of copper and silver is more effective in the production of formaldehyde from methyl alcohol than either of the metals alone. The application of my invention in connection with these promotor catalysts constitutes a material advance in the development of such catalysts, since it may be employed for readily incorporating together in charcoal any number of metals or other catalytic substances.

(9) Catalytic oxidation reactions, if not carried on at excessive temperatures, may also be effected by these compound charcoal catalysts.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process of making compound adsorbent catalyst, molding a mixture of carbon, catalytic material and a binder and then activating the carbon therein by heating at high temperatures.

2. In a process of making compound adsorbent catalyst, molding a mixture of finely divided carbon, finely divided catalytic material and a binder and then activating the carbon therein by heating at high temperatures.

3. In a process of making compound adsorbent catalyst, molding a mixture of carbon, catalytic material and a binder which chars on heating, charring the binding material in the molded mixture and then activating the carbon therein by heating at high temperatures.

4. In a process of making compound adsorbent catalyst, molding a mixture of finely divided carbon, finely divided catalytic material and a binder which chars on heating, charring the binding material in the molded mixture and then activating the carbon therein by heating at high temperatures.

5. In a process of making compound adsorbent catalyst, mixing carbon and catalytic material with a binder dispersed in a liquid, molding the solid material of the resulting mixture and then activating the carbon therein by heating at high temperatures.

6. In a process of making compound adsorbent catalyst, mixing carbon and catalytic material with an emulsion of a binder, molding the solid material of the resulting mixture and then activating the carbon therein by heating at high temperatures.

7. In a process of making compound adsorbent catalyst, mixing carbon and catalytic material with a liquid binder, molding the solid material of the resulting mixture and then activating the carbon therein by heating at high temperatures.

8. In a process of making compound adsorbent catalyst, mixing carbon and catalytic material with a dispersion in a liquid of a binder which chars on heating, molding the solid material of the resulting mixture, charring the binding material in the molded mixture and then activating the carbon therein by heating at high temperatures.

9. In a process of making compound adsorbent catalyst, mixing carbon and catalytic material with an emulsion in a liquid of a binder which chars on heating, molding the solid material of the resulting mixture, charring the binding material in the molded mixture and then activating the carbon therein by heating at high temperatures.

10. In a process of making compound adsorbent catalyst, mixing carbon and catalytic material with a liquid binder which chars on heating, molding the solid material of the resulting mixture, charring the binding material in the molded mixture and then activating the carbon therein by heating at high temperatures.

11. In a process of making compound adsorbent catalyst, molding a mixture of carbon, catalytic material and a binder, comminuting the molded material and then activating the carbon therein by heating at high temperatures.

12. In a process of making compound adsorbent catalyst, molding a mixture of finely divided carbon, finely divided catalytic material and a binder which chars on heating, comminuting the molded material and charring the binding material therein and then activating the carbon therein by heating at high temperatures.

13. In a process of making compound adsorbent catalyst, mixing carbon and catalytic material with a binder dispersed in a liquid, molding the solid material of the resulting mixture, comminuting the molded material and charring the binding material therein and then activating the carbon therein by heating at high temperatures.

14. In a process of making compound adsorbent catalyst, mixing carbon and catalytic material with an emulsion of a binder, molding the solid material of the resulting mixture, comminuting the molded material and charring the binding material therein and then activating the carbon therein by heating at high temperatures.

15. In a process of making compound adsorbent catalyst, mixing carbon and catalytic material with a liquid binder, molding the solid material of the resulting mixture, comminuting the molded material and charring the binding material therein and then activating the carbon therein by heating at high temperatures.

16. In a process of making compound adsorbent catalyst, mixing finely divided carbon, finely divided catalytic material and a dispersion in a liquid of a binder which chars on heating, molding the solid material of the resulting mixture, comminuting the molded material and charring the binding material therein and then activating the carbon therein by heating at high temperatures.

17. In a process of making compound adsorbent catalyst, molding a mixture of carbon, catalytic material and a binder and then activating the carbon therein by heating and treatment with a mild oxidizing agent at high temperatures.

18. In a process of making compound adsorbent catalyst, molding a mixture of finely divided carbon, finely divided catalytic material and a binder, and then activating the carbon therein by heating and steaming at high temperatures.

19. In a process of making compound adsorbent catalyst, molding a mixture of carbon, catalytic material and a binder which chars on heating, charring the binding material in the molded mixture and then activating the carbon therein by heating and steaming at high temperatures.

20. In a process of making compound adsorbent catalyst, molding a mixture of finely divided carbon, finely divided catalytic material and a binder which chars on heating, charring the binding material in the molded mixture and then activating the carbon therein by heating and treatment with a mild oxidizing agent at high temperatures.

21. In a process of making compound adsorbent catalyst, molding a mixture of carbon, catalytic material and a binder, activating the carbon therein by heating at high temperatures, cooling and then reheating at high temperatures.

22. In a process of making compound adsorbent catalyst, molding a mixture of finely divided carbon, finely divided catalytic material and a binder, activating the carbon therein by heating at high temperatures, cooling and then reheating at high temperatures.

23. In a process of making compound adsorbent catalyst, molding a mixture of carbon, catalytic material and a binder, comminuting the molded material, activating the carbon therein by heating at high temperatures, cooling and reheating at high temperatures.

24. In a process of making compound adsorbent catalyst, molding a mixture of finely divided carbon, finely divided catalytic material and a binder which chars on heating, comminuting the molded material and charring the binding material therein, activating the carbon therein by heating at high temperatures, cooling and then reheating at high temperatures.

JACQUE C. MORRELL.